Feb. 19, 1924.
H. G. JORGENSEN
1,483,940
ANTIRATTLER FOR AUTOMOBILE HOODS
Filed Nov. 14, 1921
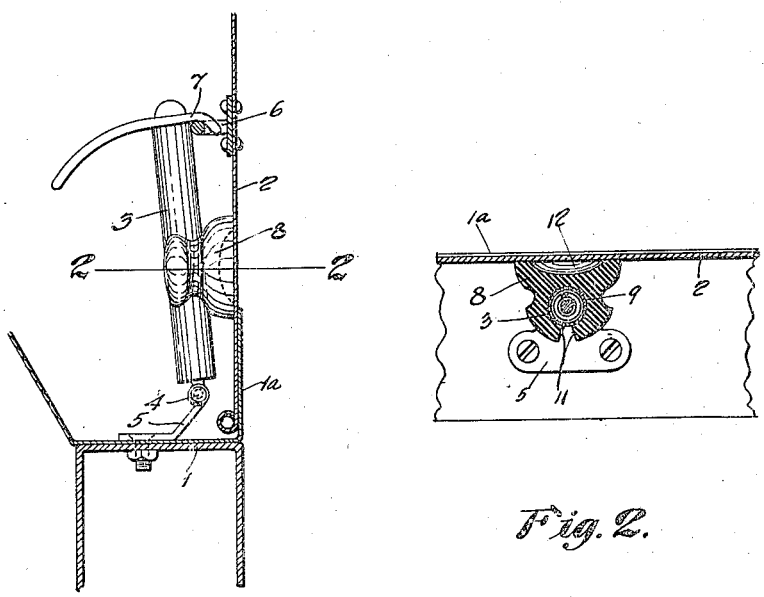
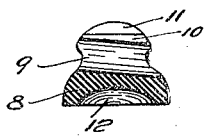
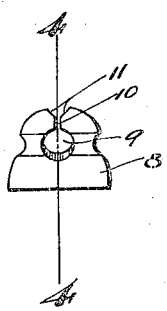

Patented Feb. 19, 1924.

1,483,940

UNITED STATES PATENT OFFICE.

HANS G. JORGENSEN, OF ERIE, PENNSYLVANIA.

ANTIRATTLER FOR AUTOMOBILE HOODS.

Application filed November 14, 1921. Serial No. 514,865.

*To all whom it may concern:*

Be it known that I, HANS G. JORGENSEN, was formerly a subject of the King of Denmark, but have now declared my intention of becoming a citizen of the United States by taking out my first naturalization papers, residing at Erie, in the county of Erie and State of Pennsylvania, have invented new and useful Improvements in an Antirattler for Automobile Hoods, of which the following is a specification.

This device is designed to prevent the rattling of hoods on automobiles and is so formed as to be readily applied, to be adjustable for different fasteners and to be such as not to mar the surfaces engaged. In carrying out the invention the device preferably adheres to the hood so as to hold it in both directions.

The invention is illustrated in the accompanying drawings as follows:—

Fig. 1 shows a section of a hood with a fastener in place thereon.

Fig. 2 a section on the line 2—2 in Fig. 1.

Fig. 3 an elevation of the anti-rattling device.

Fig. 4 a section on the line 4—4 in Fig. 3.

1 marks the automobile frame, 2 the hood, 3 a fastener, 4 the fastener hinge, 5 the bracket or base by which the fastener is secured to the frame, 6 a loop on the hood side and 7 the usual yielding hook on the fastener for engaging the loop 6.

It will be noted that the fastener extends at an angle in order to have a tendency to pull the hood inwardly against the wall 1ª.

The anti-rattler is in the form of a block 8 having a face adapted to engage the side of the hood. This block is formed of resilient rubber. It has an opening 9 to receive the fastener 3, this opening being preferably on the slant so as to bring the face of the block into proper relation to the side of the hood. A slit 10 extends through the wall of the opening permitting the walls to be sprung open to receive the fastener 3. The opening 9 is of a size so that the walls of the opening grip the fastener through the resilience of the rubber. The outer edge of the slit is bevelled at 11 so as to assist in opening the slit for engagment on the fastener.

The face of the anti-rattler is cupped at 12. This when pressed against the side of the hood forms a slight vacuum so that the anti-rattling device adheres to the side of the hood and thus holds in both directions. Where this is cupped in this way the cup portion may be pressed inwardly spreading the walls of the opening open so as to assist in placing the device on the fastener.

What I claim as new is:—

1. An anti-rattler formed of a block of resilient rubber with a face adapted to engage the side of a hood and having an opening therethrough adapted to receive and grip a fastener, the opening being slitted to permit the walls of the opening to be sprung over the fastener, the block extending forward from the opening a sufficient distance to permit the opening of the slit by pressure on the projecting portion of the block.

2. An anti-rattler formed of a block of resilient rubber with a cupped face adapted to engage and adhere to the side of a hood and having an opening therethrough adapted to receive and grip a fastener, the opening being slitted to permit the walls of the opening to be sprung over the fastener.

3. An anti-rattler in the form of a block of resilient rubber with a face adapted to engage the side of a hood and having an opening adapted to receive and grip a fastener, the opening being slitted to permit the walls of the opening to be sprung over the fastener, the outer portion of the slit being flaring to facilitate the spreading of the walls.

4. An anti-rattler formed of a block of resilient rubber with a face adapted to engage one surface and having an opening therethrough adapted to grip an adjacent part, the opening being slitted to permit the walls of the opening to be sprung over the adjacent part, the block extending forward from the opening a sufficient distance to permit the opening of the slit by pressure of the projecting portion of the block.

5. An anti-rattler formed of a block of resilient rubber with a cupped face adapted to engage and adhere to one surface and having an opening therethrough adapted to grip an adjacent part, the opening being slitted to permit the walls to be sprung over the adjacent part.

6. An anti-rattler formed of a block of resilient rubber with a face adapted to engage a surface and having an opening adapted to receive and grip an adjacent part, the opening being slitted to permit the walls of the opening to be sprung over the adjacent part, the outer portion of the slit being flaring to facilitate the spreading of the walls.

7. In an anti-rattler, the combination of an automobile hood; a hood fastener comprising a bar arranged adjacent to the hood; and a silencing member secured to the bar, said member having a vacuum cupped portion formed of rubber in pressed engagement with the side of the hood.

8. In an anti-rattler, the combination of an automobile hood; a hood fastener comprising a bar arranged adjacent to the hood; and a silencing member detachably secured to the bar, said member having a vacuum cupped portion formed of rubber in pressed engagement with the side of the hood.

9. In an anti-rattler, the combination of an automobile hood; a hood fastener comprising a bar arranged adjacent to the hood; and a silencing member formed of rubber having an open slot in its rear face detachably engaging the bar and a vacuum cupped face in pressed engagement with the hood.

In testimony whereof I have hereunto set my hand.

HANS G. JORGENSEN.